United States Patent [19]

Hosking

[11] Patent Number: 5,000,648

[45] Date of Patent: Mar. 19, 1991

[54] BARRIER LIFTER

[76] Inventor: John H. Hosking, 451 Sunset Drive, Oakville, Ontario, Canada, L6L 3N3

[21] Appl. No.: 525,579

[22] Filed: May 21, 1990

[51] Int. Cl.[5] .......................... B60P 1/04; B65G 9/00; B66C 1/42

[52] U.S. Cl. .................................... 414/618; 212/243; 294/110.1; 414/467; 414/729

[58] Field of Search ............... 414/467, 487, 542, 543, 414/555, 560–561, 569, 592, 618, 621, 626, 729, 732, 734–736, 739–742; 212/242–243; 294/81.61, 110.1, 82.1, 82.11, 82.13, 82.14, 82.2, 82.21, 82.25, 82.34, 85, 94–96, 101

[56] References Cited

U.S. PATENT DOCUMENTS

| | | | |
|---|---|---|---|
| 1,280,951 | 10/1918 | Blackmair | 212/243 |
| 2,408,719 | 10/1946 | Abernethy | 294/85 |
| 2,674,380 | 4/1984 | Boudreaux | 212/243 |
| 2,857,193 | 10/1958 | Heppenstall | 294/86.4 |
| 4,035,010 | 7/1977 | Kawashita et al. | 294/101 |

*Primary Examiner*—Joseph F. Peters, Jr.
*Assistant Examiner*—R. B. Johnson
*Attorney, Agent, or Firm*—Arne I. Fors; Jeffrey T. Imai

[57] ABSTRACT

An apparatus for mounting onto a lifting machine for gripping and lifting a highway barrier and the like, said apparatus comprising a body adapted to be mounted on to the lifting machine. A pair of clamping arms is pivotally and slidingly engaging the body and having mechanical advantage means pivotally engaging and extending between the body and clamping arms for releasably applying a gripping force to the barrier and to lift same. Locking means engaging the clamping arms is provided for successively locking the clamping arms in an open position to receive the barrier, unlocking the clamping arms in an operative position to apply the gripping force and thereafter locking the clamping arms in the open position for reuse upon release of the barrier.

1 Claim, 3 Drawing Sheets

FIG. 2
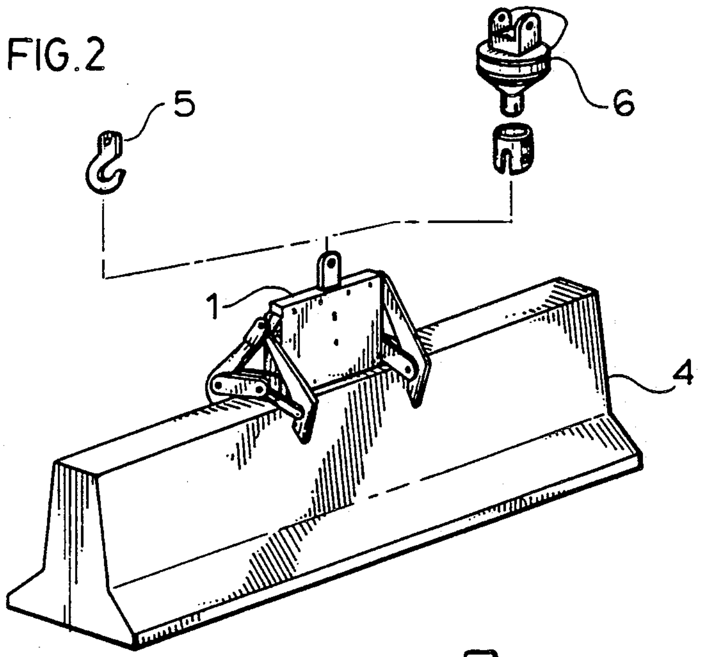
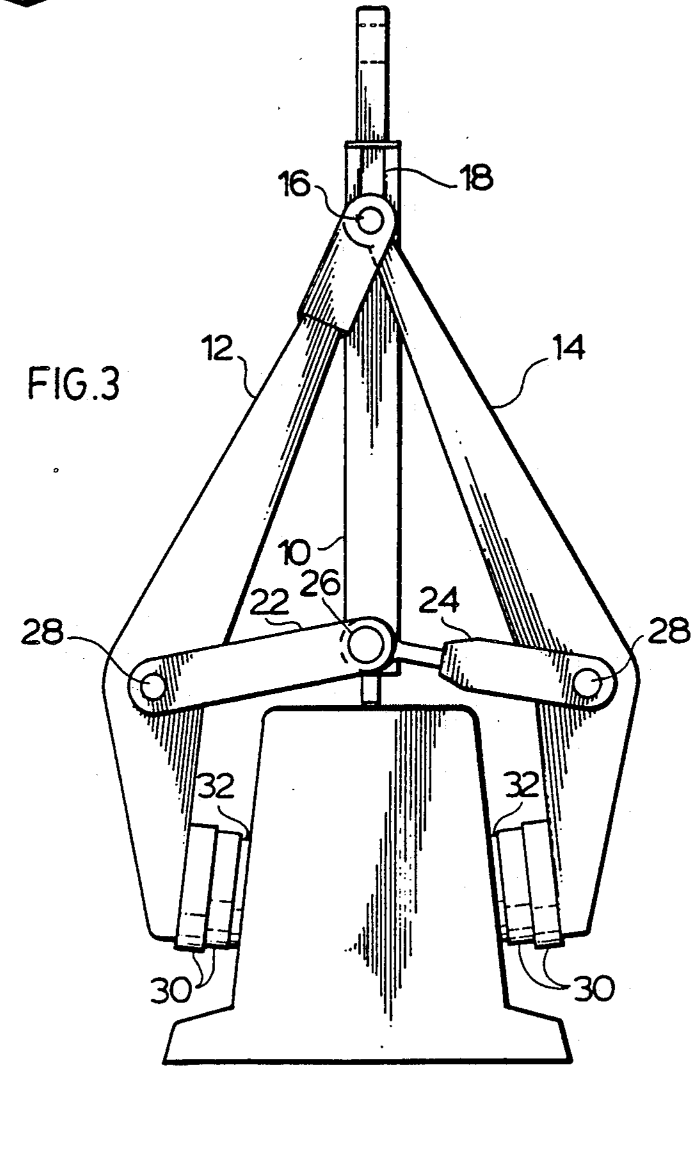
FIG. 3

BARRIER LIFTER

FIELD OF INVENTION

This application relates to an apparatus for lifting concrete barriers.

BACKGROUND OF INVENTION

Wedged shaped concrete barriers are commonly used during highway construction to separate the highway traffic from the construction workers and equipment. They are generally short sections so that the barriers may be portable. However, the weight of such concrete barriers dictates that heavy equipment or lifting machines, such as a fork lift, hydraulic crane or front end loader, is required to remove such barriers from flatbed trucks used to transport the barriers to the road surface for placement during use.

Devices have been proposed to be mounted onto lifting machines for lifting the concrete barriers. Such devices are generally difficult to use or require hydraulic drive means in order to actuate the device. Such devices are time consuming to install and require special skill in order to operate.

Still other devices have been proposed which alleviate the need for hydraulic hook-up to actuate. Such devices comprise caliper arms having a mechanical advantage in order to provide sufficient force to grip the concrete barriers prior to lifting. However, such apparatus generally do not stay open when not lifting a barrier due to the mechanical arrangement of the caliper arms. Such apparatus become cumbersome and dangerous to use as the device must be opened manually in order to be applied to the concrete barrier. Manual labour required to open the device increases the risk of injury to the labourer. The number of labourers required to install the concrete barriers also increases.

SUMMARY OF INVENTION

These disadvantages may be overcome by providing an apparatus with a simple mechanical means to maintain the arms of the apparatus open until lifting of the barrier is required, whereby the arms are permitted to close providing adequate gripping force and thereafter releasing the barrier maintaining the arms open.

According to one aspect of the invention there is provided an apparatus for mounting onto a lifting machine for gripping and lifting a highway barrier and the like, said apparatus comprising a body adapted to be mounted on to the lifting machine. A pair of clamping arms is pivotally and slidingly engaging the body and having mechanical advantage means pivotally engaging and extending between the body and clamping arms for releasably applying a gripping force to the barrier and to lift same. Locking means engaging the clamping arms is provided for successively locking the clamping arms in an open position to receive the barrier, unlocking the clamping arms in an operative position to apply the gripping force and thereafter locking the clamping arms in the open position for reuse upon release of the barrier.

DESCRIPTION OF DRAWINGS

In the drawings which illustrate embodiments of the invention,

FIG. 2 is a perspective view of the embodiment of FIG. 1 gripping a concrete barrier and illustrating the methods of attaching the invention to the lifting machine;

FIG. 3 is an end view of the embodiment of FIG. 1 gripping a concrete barrier;

DETAILED DESCRIPTION OF THE PREFERRED EMBODIMENT

Figure 1:
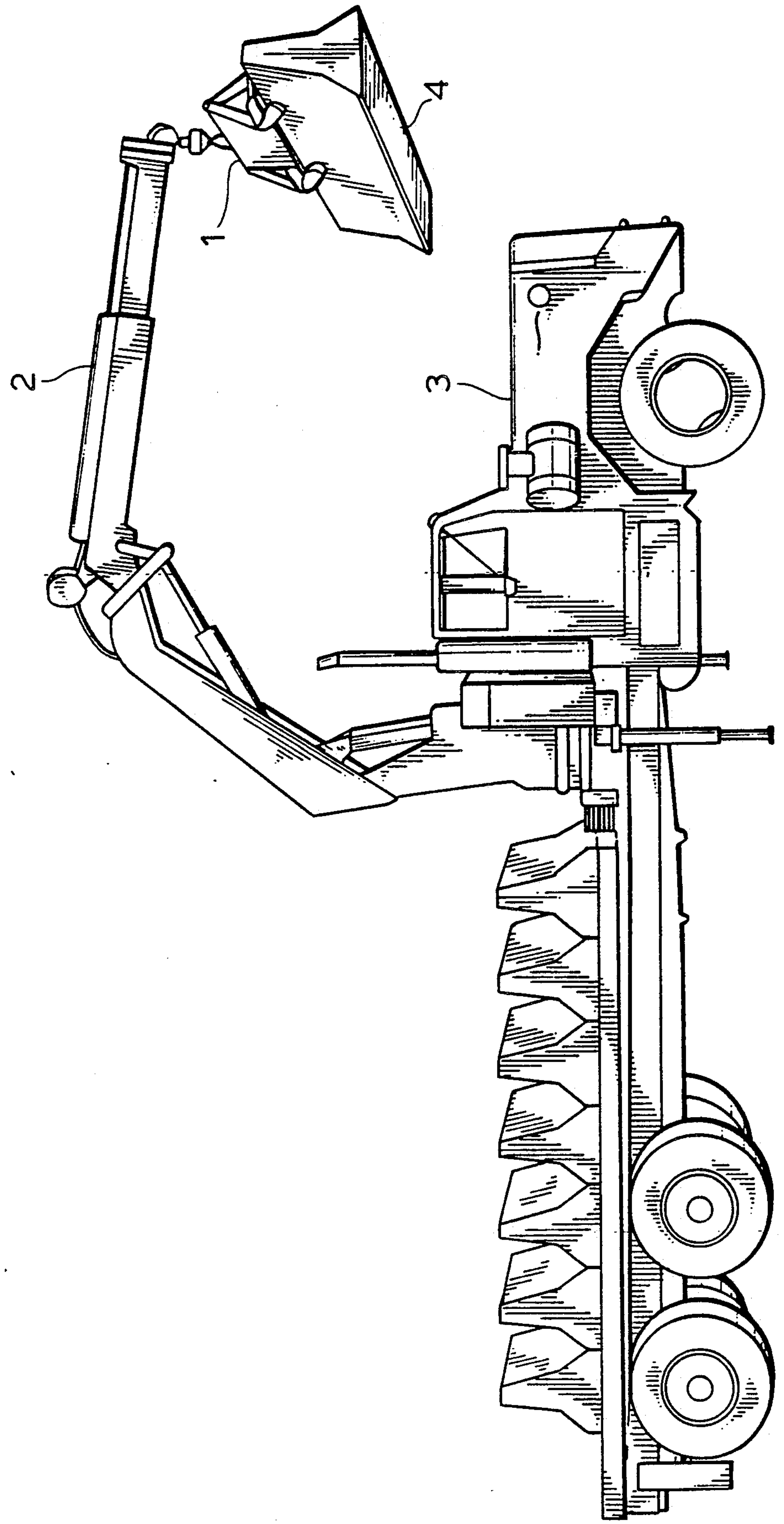
FIG. 1 is a perspective view of one embodiment of the invention installed on a crane of a flatbed truck and gripping a concrete barrier.

With reference to FIG. 1, the apparatus 1 is shown in use, mounted on a hydraulic crane 2 of a flatbed truck 3 carrying a concrete barrier 4.

With reference to FIG. 2, the apparatus 1 may be installed to hydraulic crane 2 using a hook 5 mounted on an end of hydraulic crane 2. In the preferred embodiment, apparatus 1 is mounted on hydraulic crane 2 by a rotator 6. Rotator 6 may be operated by the same person operating the crane thereby reducing the number of labourers. Rotator 6 permits the crane operator to rotate the barrier 4 to the desired position.

With reference to FIG. 3, the apparatus comprises generally a body 10 having a hollow body and a substantially rectangular outline on each surface thereof. Body 10 generally has a width which exceeds its height which exceeds its depth.

Body 10 is provided with a pair of like clamping arms 12 and 14 pivotally attached to the body 10 at opposite ends thereof through hinge pin 16. Hinge pin 16 slidably engages the side of body 10 in aperture opening 18.

Body 10 is further provided with a pair of like clamping links 22 and 24 pivotally attached at one end by pin 26 mounted below hinge pin 16 on each end of body 10. Clamping links 22 and 24 are pivotally connected at their opposite end to clamping arm 12 and 14 respectively by clamping pins 28.

Clamping arms 12 and 14 at the end remote from hinge pin 16 are provided with gripping pad cups 30 and gripping pads 32. Gripping pads 32 are made of a material having a high coefficient of friction with respect to concrete.

Figure 4:
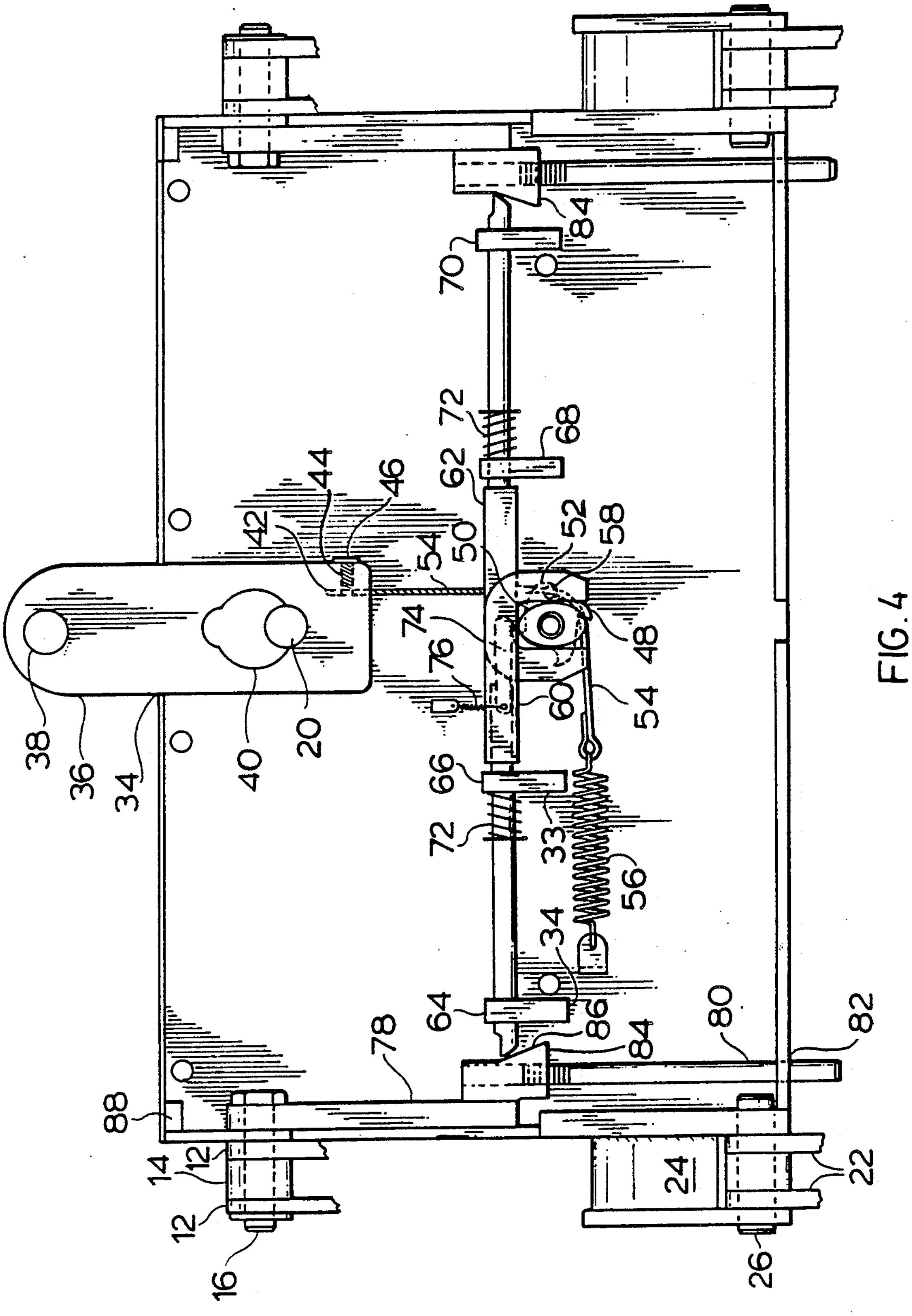
FIG. 4 is a front elevation view with the front cover removed of the embodiment of FIG. 1.

With reference to FIG. 4, body 10 is further provided with a lifting pin 20 which is along the centre line of body 10 and substantially perpendicular to the centre line and extending from the front and back wall of body 10.

The top of body 10 is provided with an aperture opening 34 at the centre line of body 10. Lifting lug 36 extends through aperture opening 34. Lifting lug 36 is provided with a first hole 38 and a second hole 40, extending substantially perpendicular to front and back walls of body 10. Lifting pin 20 is within hole 40. Hole 40 has a length greater than the diameter of lifting pin 20 permitting lifting lug 36 to move relative to lifting pin 20 in a direction substantially parallel to the centre line of body 10.

Lifting lug 36 is provided with a first bore 42 running parallel to the centre line of lifting lug 36 and a second tapped bore 44 running perpendicular to bore 42 and intersecting therewith. Bore 44 is tapped to receive screw 46.

Immediately below lifting pin 20 and on the centre line of body 10 is latching cam 48. Latching cam 48 is rotatably mounted onto body 10 having an axis of rotation substantially perpendicular to the centre line of body 10 and extending from the front to back walls of body 10.

Latching cam 48 comprises two cam surfaces, the first being an elliptical cam 50 and the second being two pair of diametrically opposed like ratchet teeth 52 adapted to transmit rotational forces in one sense.

Lifting lug 36 is further provided with a latching cam cable 54 which is inserted into bore 42 and locked in place by inserting bolt 46 in tapped bore 44 and advancing said bolt until latching cam cable 54 is firmly secured within bore 42.

Latching cam cable 54 extends about latching cam 48 and is connected at the remote end from lifting lug 36 to spring 56. Spring 56 is firmly affixed to body 10 to maintain tension in latching cam cable 54. Intermediate the ends of latching cam cable 54 is firmly affixed a cable dog 58 for engagement with one of the ratchet teeth 52 of latching cam 48.

The proportion to which lifting lug 36 is permitted to move relative to body lifting pin 20 is directly proportional to the circumferential distance of one quarter rotation of the ratchet teeth 52 of latching cam 54.

The apparatus is further provided with a pair of latch pins or rockers 60 and 62 having an "L" shaped cam follower. Blocks 64 and 66 are mounted to back wall of body 10 and having a bore therethrough for receiving latch pins 60 in sliding engagement in a direction substantially perpendicular to the centre line of body 10. Latch pin 62 is similarly mounted in blocks 68 and 70 but extending in a direction opposite latch pin 60. Cam follower of latch pin 60 extends beyond the centre line of body 10 and rests on the elliptical cam 50 of latching cam 48. Similarly, cam follower of latch pin 62 extends beyond the centre line of body 10 and rests on the opposite side of the elliptical cam 50 of latching cam 48. Latch pin 60 and 62 are further provided with a spring 72 urging the cam follower to rest upon the elliptical cam 50 of latching cam 48. The apparatus is further provided with a cam holding pawl 74 pivotally connected to the back wall of body 10 and engaging one of the ratchet teeth 52 of latching cam 48. Pawl spring 76 is connected to cam holding pawl 74 to urge cam holding pawl 74 against latching cam 48 restricting rotation of cam 48 to a counterclockwise direction.

Hinge pin 16 on the inside end surface of body 10 is connected to sliding support 78 which extends vertically and which is connected to release push rod 80. Push rod 80 extends through bottom hole 82 in the bottom surface of body 10 such that release push rod 80 moves vertically in tandem with hinge pin 16. Sliding support 78 is further provided with latch lip 84 and cam surface 86 for engagement with latch pin 60 at an end remote from the cam follower.

In operation, the apparatus is mounted on a lifting machine such as a hydraulic arm of a tractor or a hydraulic crane and a flatbed truck. Hole 38 of lifting lug 36 is provided for this purpose. Hook 5 or rotator 6 is inserted through hole 38 securing apparatus 1 to hydraulic crane 2.

A lifting force is applied to lifting lug 36 and should be adequate to lift the apparatus above the ground. Lifting lug 36 engages body lifting pin 20 at the lower extreme of hole 40. The apparatus is first lowered until gripping pad cups 30 contact the ground surface. The lowering motion is continued causing lifting lug 36 to move relative to body 10 and lifting pin 20 until lifting pin 20 contacts the upper edge of hole 48 of lifting lug 36. Further lowering movement causes body 10 to move downward. As body 10 moves downward, hinge pin 16 will move upward relative to body 10 until sliding support 78 contacts travel stop 88. The relative motion of body 10 with respect to clamping arms 12 and 14 and clamping link 22 and 24 cause the ends of clamping arms 12 and 14 to be pushed apart. Since arms 12 and 14 are hinged at hinge 16, the ends having gripping pads 32 are pushed apart.

As lifting lug 36 moves downward relative to body 10 the tension applied by latch spring 56 causes cable 54 to travel in a clockwise direction about latching cam 48. Cable dog 58 accordingly travels around latch cam 48 until it advances to the next clockwise ratchet tooth 52 of latching cam 48.

Lifting lug 36 is then raised and lifted vertically relative to body lifting pin 20. Latching cam cable 54 together with cable dog 58 will move accordingly about latching cam 48 advancing latching cam 48 one-quarter rotation in a counterclockwise direction.

The elliptical cam 50 of latching cam 48 will also move one-quarter rotation until the major axis of the elliptical cam 50 is substantially vertical.

In this position latch pins 60 and 62 will extend into the path of latch lip 84 of sliding support 78.

As lifting lug 36 is further raised latch lip 84 will engage latch pin 60 and 62 preventing relative downward movement of sliding support 78 and thereby restricting the relative motion of hinge pin 16 and pin 26. In this position, the clamping arms 12 and 14 remain fixed relative to each other and relative to clamping link 22 and 24 maintaining gripping pads 32 in a fixed spaced relation.

The lifting apparatus may now be lifted over top a concrete barrier. The apparatus 1 is lowered until release push rod 80 contacts the top surface of the concrete barrier 4.

Further lowering of lifting lug 36 causes latching cam cable 54 to advance cable dog 58 around latching cam 48 in a clockwise direction until cable dog 58 engages the next clockwise ratchet tooth 52 of latching cam 48.

Lifting lug 36 is again lifted vertically relative to lifting pin 20 urging latching cam cable 54 counterclockwise about latching cam 48 thereby causing latching cam 48 to rotate one-quarter rotation counterclockwise. The elliptical cam 50 of cam 48 rotates accordingly until the major axis of the ellipse is substantially perpendicular to the centre line of body 10. The rotation of the elliptical surface urges the latch pins 60 and 62 outwardly retracting the remote end thereof out of the path of latch lip 84 of sliding support 78.

As lifting lug 36 is further lifted vertically, body 10 moves vertically. Hinge pin 16 moves downwardly in aperture opening 18 and relative to body 10 and pin 26. As body 10 and pin 26 moves upwardly relative to hinge pin 16, clamping links 22 and 24 urge the clamping arms 12 and 14 together until gripping pads 32 contact the side wall of the concrete barrier 4.

Once the clamping arms 12 and 14 have been urged together to the limit of the distance of the remote ends, hinge pin 16 will no longer move relative to lifting pin 26. At such time, further lifting force applied to lifting lug 36 will lift the apparatus together with the concrete barrier provided the frictional forces between gripping pads 32 and the side walls of the concrete barrier 4 exceed the gravitational force of the weight of the concrete barrier 4.

The concrete barrier 4 can then moved to the desired location.

The apparatus 1 together with the concrete barrier 4 are lowered until the concrete barrier 4 rests upon the ground surface. To release the barrier 4, lifting lug 36 is lowered lowering body 10 until release push rod 80 contacts the top of the concrete barrier. Sliding support 78 and accordingly hinge pin 16 will move upwardly relative to body 10 along aperture opening 18. The relative movement between hinge pin 16 and lifting pin 26 cause the clamping arms 12 and 14 to move away from each other and release the concrete barrier 4.

As lifting lug 36 is lowered it will move relative to lifting pin 20 until lifting pin 20 contacts the upper surface of hole 40.

The latching cable cam 54 will move clockwise around the latching cam 48 as a result of the tension applied by latch return spring 56. Cable dog 58 will advance around latching cam 48 in a clockwise sense until it advances past the next clockwise ratchet tooth 52 of latching cam 48.

The lifting lug 36 is again lifted vertically causing the lifting lug to move vertically relative to lifting pin 20. Latching cam cable 54 causing latching cam 48 to rotate one-quarter rotation and thereby placing the major axis of elliptical cam 50 in the vertical direction.

Latch pin 60 and 62 following the elliptical cam 50 of latching cam 48 moves outwardly from the central line of body 10 causing the remote end thereof to enter into the path of latch lip 84.

As lifting lug 36 is again raised until body lifting pin 20 rests against the lower portion of hole 40 of lug 36, body 10 is again raised vertically. The weight of clamping arms 12 and 14 cause hinge pin 16 to move downwardly relative to body 10 until latch lip 84 contacts the remote end of latch pin 60 and 62 thereby restricting the relative motion of hinge pin 16 with respect to body 10 and lifting pin 26. Clamping arms 12 and 14 are thereby maintained in an open position with the gripping pads 32 maintained in a spaced relation releasing the barrier 4.

Apparatus is in a position for re-use.

It is understood that the present disclosure of the preferred embodiment has been made only by way of example and that numerous changes in detail or construction and the combination and arrangement of parts may be resorted to without departing from the spirit and the scope of the invention.

I claim:

1. An apparatus for mounting onto a lifting machine for gripping and lifting articles, said apparatus comprising:

a body adapted to be mounted onto said lifting machine;

a pair of clamping arms pivotally and slidably engaging said body on a first pivot; mechanical advantage means pivotally engaging and extending between said body and clamping arms for releasably applying a gripping force to an article to be lifted, said mechanical advantage means comprising a first and second linking arm pivotally engaging each other and said body at a second pivot below said first pivot, said first linking arm pivotally engaging one of said clamping arms and the second linking arm pivotally engaging the other of said clamping arms, said first pivot adapted to move in a direction opposite to said second pivot and urging ends of said clamping arms remote from said first pivot to apply said gripping force to the article until said gripping force excess the weight of the article;

locking means for successively locking said clamping arms in first position to receive said article, unlocking said clamping arms in a second position to apply said gripping force and thereafter locking said clamping arms in said first position for re-use upon release of an article, a lug for mounting said body to said lifting machine, said lug being in sliding engagement with said body and restricted to slide a fixed distance whereby displacement thereof triggers said locking means to lock and unlock said clamping arms;

said locking means comprising a cam rotatably mounted in said body, said cam having an elliptical surface and a plurality of ratchet teeth circumferentially spaced about the axis of rotation of said cam;

a cable having a cable dog for engagement with one of said ratchet teeth and extending from said lug about said cam and connected to said body, bias means urging said cable onto said cam;

a pawl for engaging said cam and restricting rotation thereof to one direction;

a rocker slidably engaging said body and biased to have a first end thereof engage said elliptical surface of said cam and a second end adapted to engage and disengage with said first pivot for locking and unlocking said clamping arms.

* * * * *